United States Patent [19]
Maurer

[11] Patent Number: 5,635,066
[45] Date of Patent: Jun. 3, 1997

[54] PRESSURE FILTER WITH A BACK-FLUSHING HEAD EXERTING A UNIFORM CONTACT PRESSURE

[75] Inventor: Uwe Maurer, Schwelm, Germany

[73] Assignee: Mike Maurer, Schwelm, Germany

[21] Appl. No.: 392,768

[22] PCT Filed: Jun. 21, 1994

[86] PCT No.: PCT/DE94/00704

§ 371 Date: Apr. 12, 1995

§ 102(e) Date: Apr. 12, 1995

[87] PCT Pub. No.: WO95/00227

PCT Pub. Date: Jan. 5, 1995

[30] Foreign Application Priority Data

Jun. 24, 1993 [DE] Germany ............ 43 20 952.1

[51] Int. Cl.⁶ ............ B01D 29/68; B01D 29/01; B01D 29/39; B01D 35/027
[52] U.S. Cl. ............ 210/411; 210/333.01; 210/333.1; 210/415
[58] Field of Search ............ 210/333.01, 333.1, 210/791, 411, 413, 415, 396, 414

[56] References Cited

U.S. PATENT DOCUMENTS 2,802,572  8/1957  Jalkanen.
2,834,474  5/1958  Jalkanen.
3,640,395  2/1972  Kinney.
4,085,051  4/1978  Karinsky.
4,162,219  7/1979  Miropolsky.
4,303,522  12/1981  Ducasse.

FOREIGN PATENT DOCUMENTS 2737135  3/1979  Germany.
3734245  4/1989  Germany.

Primary Examiner—Thomas M. Lithgow
Attorney, Agent, or Firm—Herbert Dubno

[57] ABSTRACT

A pressure filter having a fluid compartment with a fluid inlet, at least one filter surface in the fluid compartment having a plurality of apertures, one side of the filter surface being restricted by the fluid compartment and the other side thereof being restricted by a filtrate compartment and having a filtrate outlet, and a backwasher means. The backwasher means includes a backwashing head sweeping over the filter surface and sealing a part thereof with respect to the fluid compartment. It restricts a backwashing compartment having at least one suction chamber open in a slot-like manner to the filter surface and having connected thereto a reject drain. A resiliently acting pressure unit is associated with the slat-like or plate-like backwashing head, the pressure unit pressing the radial outer portion of the backwashing head axially towards the filter surface. By this, a uniform contact pressure of the backwashing head against the filter surface in radial direction is guaranteed.

15 Claims, 5 Drawing Sheets

PRESSURE FILTER WITH A BACK-FLUSHING HEAD EXERTING A UNIFORM CONTACT PRESSURE

SPECIFICATION

CROSS REFERENCE TO RELATED APPLICATIONS

This application is a national phase of PCT/DE 94/00704 filed June 1994 and based, in turn, upon German National application P 43 20 952.1 under the international convention.

FIELD OF THE INVENTION

The present invention directs to a pressure filter comprising a fluid compartment with a fluid inlet, at least one filter surface within the fluid compartment having a plurality of apertures, one side of the filter surface being restricted by the fluid compartment and the other side thereof being restricted by a filtrate compartment having a filtrate outlet, and backwashing means with a slat-like or plate-like backwashing head sweeping over the filter surface and sealing a part of the filter surface with respect to the fluid compartment, the backwashing head having a backwashing compartment restricting at least one suction chamber open in a slot-like manner to the filter surface, the backwashing compartment having a reject drain connected thereto.

BACKGROUND OF THE INVENTION

A pressure filter of the above-described type is known from EP 0 479 077 A1. This pressure filter works with a continuous cleaning of the filter surface and is especially destined for the separation of solids from suspensions. To the fundamental construction of such a pressure filter a plurality of pressure-tight filter elements separating the fluid compartment from the filtrate compartment and forming the filter surface and the backwashing means connected to the reject drain and having a backwashing head sealing a part of the filter surface with respect to the fluid compartment belong. The backwashing head and the filter surface are movable with respect to one another. The fluid to be filtered is supplied to the pressure filter with a pressure $P_1$ and acts on the filter elements with this pressure $P_1$ in the fluid compartment. The filtrate is drained from the filtrate compartement with a lower pressure $P_2$. In the reject drain and backwashing compartment restricted by the backwashing head a pressure $P_3$ is adjustable which is always smaller than the pressure $P_2$ in the filtrate compartment. A filtration occurs on account of the pressure difference between the pressure $P_1$ of the fluid compartment and the pressure $P_2$ of the filtrate compartment, wherein solids are deposited on the filter surface and form a cover layer. This cover layer is continuously cleaned by backwashing, i.e. a conversion of the flow direction through the filter elements. The backwashing occurs at that portion of the filter surface which is sealed by the backwashing head with respect to the fluid compartment with a pressure difference between the pressure $P_2$ in the filtrate compartment and the pressure $P_3$ in the backwashing compartment. The filtration process at the remaining filter surface of the pressure filter is not influenced by the backwashing.

According to the known pressure filter the backwashing compartment has at least one suction chamber open to the filter surface in a slot-like manner. This suction chamber is formed as elongated chamber extending from a central drive shaft for the backwashing head radially outwardly. Upon rotation of the backwashing head the slot-like aperture sweeps over the filter surface as a radial beam emanating from the center of the pressure filter. Now, it became evident that difficulties result to assure at each radial point of the slat-like or plate-like backwashing head the same pressure against the filter surface. So, on account of the central support of the backwashing head, the pressure is higher in the central range than in the radial outer range. Especially, it became evident in practice that the radial outer end portions of the slat-like or plate-like head tend to lift off from the filter surface so that the correct realization of the backwashing progress can no more be guaranteed.

OBJECT OF THE INVENTION TO PROVIDE A PRESSURE

It is the object of the invention to provide a pressure filter of the cited type according to which the uniform pressure of the backwashing head is assured over the whole radial dimension of the same.

SUMMARY OF THE INVENTION

According to the invention this problem is solved by the feature that a resiliently acting pressure means is associated with the slat-like or plate-like backwashing head and presses the radial outer portion of the backwashing head axially towards the filter surface.

By the pressure means provided according to the invention one succeeds in assuring uniform pressure relations of the backwashing head with respect to the filter surface. By this, the backwashing process can be carried out with the desired pressure difference between pressure $P_2$ in the filtrate compartment and the pressure $P_3$ in the backwashing compartment without disturbances with regard to the maintenance of the desired pressure difference result by lifting off of the backwashing head from the filter surface in the radial outer portions of the same. Accordingly, the cover layer formed on the filter surface can be continuously cleaned in an especially uniform manner since uniform pressure relations in radial direction are guaranteed. The radial outer portions of the backwashing head do no more lift off from the filter surface.

According to an improvement of the invention the pressure applied by the pressure means is adjustable. By this, the pressure can be selected in response to the present conditions and can be adapted to respective conditions. If one recognizes that normally relative uniform pressure relations in radial direction are present the pressure means is adjusted such that only a slight additional pressure is applied to the outer radial portions by this. If the radial outer portions of the backwashing head show a strong tendency with regard to lifting off from the filter surface a correspondingly high contact pressure is adjusted.

Of course, the normal contact pressure of the backwashing head is predetermined by the central support of the same during the installation of the head. The pressure means provided according to the invention guarantees that uniform pressure relations are present over the whole radial dimension of the backwashing head, i.e. applies an additional pressure to the radial outer portions of the backwashing head if this should be necessary. On the whole, by the pressure means provided according to the invention a strengthening of the corresponding backwashing head is obtained with the effect that the parts of the backwashing head contacting the filter surface slide uniformly on the same.

According to a further embodiment of the invention the part of the backwashing head contacting the filter surface is resiliently supported. By this, especially good results are obtained in cooperation with the pressure means provided according to the invention since unevennesses can be compensated by the additional resilient support of the contact part or the contact parts of the backwashing head without failing to reach the aim of a uniform contact pressure over the whole radial dimension of the backwashing head. Even upon the occurrence of unevennesses on the filter surface also the radial outer portions of the contact part or of the contact parts can be pressed against the filter surface well so that, on the whole, the desired uniform contact pressure effect is obtained. Obviously, with "contact part" or "contact parts" that part or those parts of the backwashing head are meant which surround the slot-like backwashing aperture or corresponding apertures and slide on the filter surface.

Preferably, the pressure means is formed by at least one biased spring strut centrally supported at the backwashing head and at the radial end portion thereof. One spring strut or a plurality of spring struts are present dependent on the design of the backwashing head as slat or in the form of a plurality of slats or as plate so that, with the design as plate, all the radial outer circumferential zones are pressed. Accordingly, uniform contact pressure relations result also in circumferential direction. The spring strut can be supported at the backwashing head or in the plane thereof radially outside. When supporting at the backwashing head, i.e. by means of the central plane thereof, a longer lever arm results which reinforces the desired contact pressure effect. On the other side, for this the space requirement is higher.

Preferably, the spring strut is radially inside and radially outside only clamped, i.e. not mounted at the backwashing head by means of additional fastening means. Preferably, the support radially inside is realized by means of a part-spherical stud in a part-spherical bearing socket. By this, a corresponding flexibility of the support is achieved. The bearing socket is conveniently located at the central bearing of the backwashing head. If a plurality of spring struts is present, a plurality of such bearing sockets is disposed around the central bearing of the backwashing head.

According to the invention the spring strut itself is preferably designed such that it has a rod engaging into a cylinder containing at least one spring and biased by the spring. For the adjustment of the pressure the spring can be replaced, or a plurality of springs can be disposed which are adapted to the respective conditions. Preferably, cup springs are used which act on a piston-like enlargement at the end of the rod which is sealingly guided in the cylinder.

An especially preferred embodiment of the inventive pressure filter is characterized by the feature that the backwashing head comprises a carrier plate at which at least one hollow slat sweeping over the filter surface is disposed, the hollow slat having the slot-like aperture. The resiliently acting pressure means resiliently presses the radial outer portion of the carrier plate towards the filter surface. Accordingly, with this embodiment the pressure means does not directly act on the hollow slat provided with the slot-like aperture but acts on the carrier plate thereof. Preferably, a plurality of spring struts are used which are uniformly spaced around the periphery of the carrier plate. In order to not impede the filter process the carrier plate has preferably radial recesses which give it approximately the shape of a Geneva stop. Here, for example, two spring struts are associated with each arm of the stop.

Conveniently, at least one bracket is disposed at the radial outer edge of the carrier plate. The pressure means is tensioned against the bracket. This kind of fixation of the pressure means (spring struts) at the carrier plate has had favourable results.

Above an embodiment of the backwashing head was described according to which the same has a slat-like or plate-like design, but in each case extends freely radially outwardly from its central bearing in a cantilevered manner and, apart from the contact points with the filter surface, has no further support on the filter surface. However, with the embodiment described below the slat-like or plate-like backwashing head has a bearing at its radial end portion sliding or rolling on the filter element including the filter surface. The contact pressure of this bearing is also reinforced or modulated by means of the resiliently acting pressure means so that a corresponding effect as with the cantilevered slat or carrier plate results.

According to a preferred design of this embodiment the bearing has at least one roller rolling on a raised ring of the filter element. Accordingly, the roller and the ring of the filter element form a fixed guide which prevents that the backwashing head is pressed against the filter surface too strongly. Preferably, the contact pressure of the roller against the filter element is adjustable by means of further adjusting means in addition to the pressure means.

As already mentioned above, the pressure means provided according to the invention preferably cooperates with a resiliently supported contact part or a plurality of resiliently supported contact parts of the backwashing head. A corresponding compensation of unevennesses is obtained by this resilient support. Preferably, this resilient support of the part of the backwashing head contacting the filter surface is formed by a resiliently supported plate on the lower side of the backwashing head. This plate-like contact member surrounds the respective slot-like aperture on the lower side of the backwashing head by means of which the backwashing process is carried out. By this, the plate adapts itself very exactly to the filter surface so that a corresponding sealing with respect to the fluid compartment is obtained.

According to a feature of the invention the plate is supported by a silicone bearing, preferably by a silicone bearing which is formed by sheathed silicone gel cushions. Conveniently, the plate is guided on both sides and not fastened to the backwashing head so that—through support by the opposite filter surface—a floating support of the plate results which can thus completely fulfil its compensation function.

BRIEF DESCRIPTION OF THE DRAWING

The above and other objects, features, and advantages will become more readily apparent from the following description, reference being made to the accompanying drawing in which.

SPECIFIC DESCRIPTION

Figure 2:
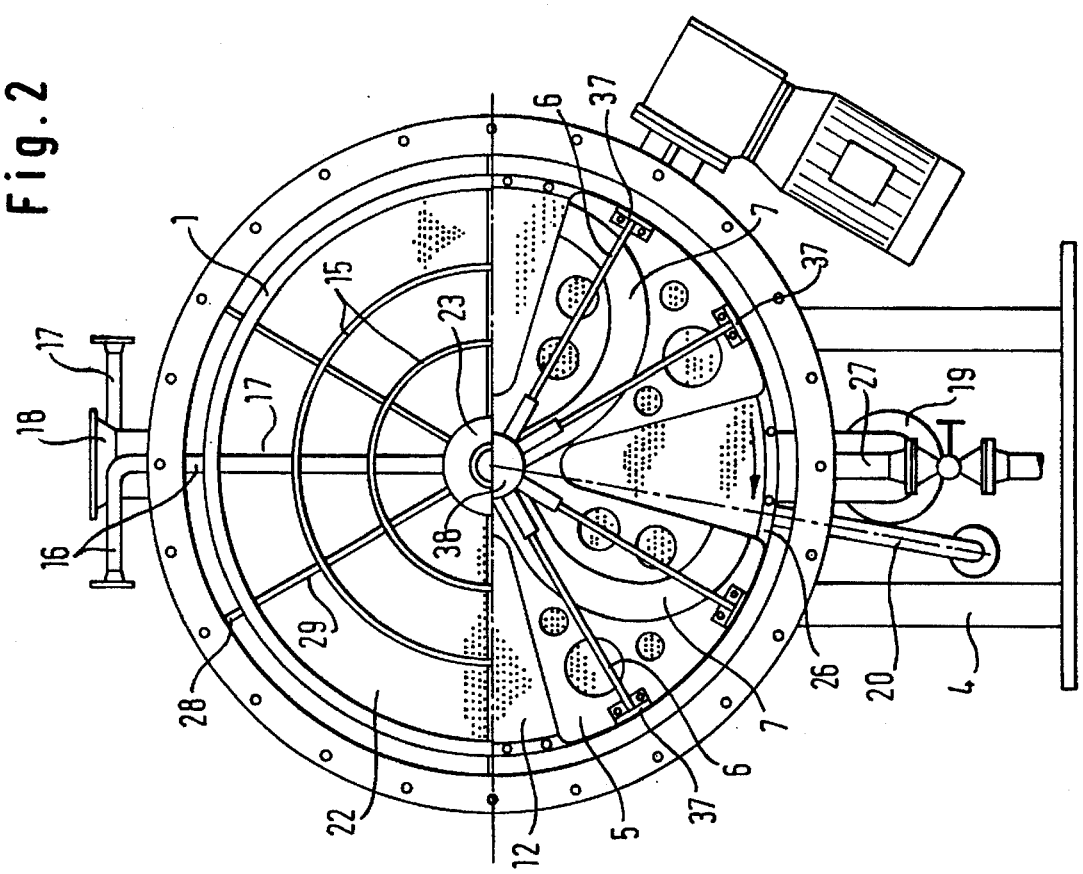
FIG. 2 is a view of the pressure filter of figure 1 with removed housing wall and partly removed backwashing head and filter elements.
Figure 1:
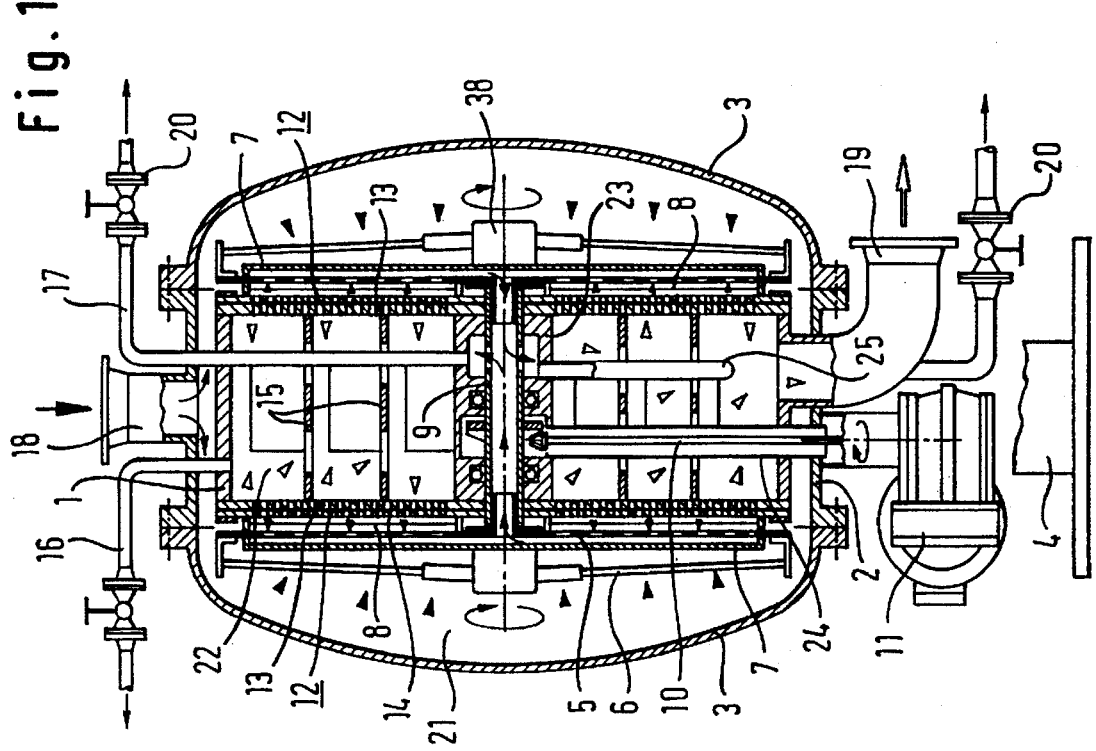
FIG. 1 is a vertical section through an inventive pressure filter.

The pressure filter shown in FIGS. 1 and 2 has a carrier ring 1 at the inner side of which support rings 15 and ribs 29 are connected in such a manner that a hub 23 is centrally held. The carrier ring 1 is closed at its two open sides by a respective circular filter element 12 which is comprised of a first and a second perforated plate 13 between which a suitable filter fleece consisting of textile material is located. These filter elements form a filter surface, respectively. The annular assembly consisting of the carrier ring 1 and the two filter elements 12 is located within a housing 3 which forms a fluid chamber 21 which is supplied with the fluid to be filtered by means of an inlet 18. A filtrate chamber having connected thereto a filtrate outlet line 19 is located within the annular assembly of the carrier ring 1 and the filter elements 12.

A hollow shaft 9 open at both ends extends through the hub 23. It is guided through slide bearings, ball bearings and seals which prevent that fluid can enter the region of the hollow shaft. Connection pieces are mounted into the open ends of the hollow shaft 9 and rotate together with the hollow shaft. A carrier plate 5 is mounted to this flange-like enlarging connection piece in a rotatably fixed manner, respectively, as described later on in detail.

The interior of the hollow shaft is connected to a ventilation line 17 and to a reject drain 25. Both lines extend through the filtrate chamber and are provided with shut-off valves (shown at 20) outside of the pressure filter, respectively. A ventilation line 16 having a suitable shut-off valve extends also from the filtrate chamber to the outside of the pressure filter.

The annular assembly of the carrier ring 1, the two filter elements 12 and the support rings 15 and the ribs 29 and the corresponding lines 16, 17, 19, 25 are stationary within the housing 3.

The pressure filter has two backwashing heads of which each is associated with a filter element 12 and sweeps over the filter surface thereof. The backwashing heads consist of a carrier plate 5 and a plurality of helically curved backwashing slats 8 which are mounted at the carrier plate. The design of the backwashing slats 8 is shown in FIG. 2. There, the drain part 7 of the backwashing slats located above the carrier plate 5 is shown. The carrier plate 5 has recesses between the individual backwashing slats 8 so that fluid from the fluid chamber 21 can enter the filtrate chamber through the filter surfaces. In their interior the backwashing slats 8 include suction chambers and are provided with a helically curved slot-like aperture at their side adjacent to the filter surface, by means of which the backwashing process is carried out. The substance formed as cover layer on the filter surface is sucked off by means of the helical slot-like aperture and is passed to the reject drain part 7 of the backwashing slats through apertures formed in the carrier plate 5. From the reject drain part the reject moves radially inwardly into the hollow shaft 9 and from there to the reject drain 25 to the outside of the pressure filter.

The backwashing heads are driven by the hollow shaft 9 which is connected on its outside to a cup gear which meshes with a bevel gear of a drive shaft 10 disposed within a tube 24 extending through the fluid chamber and the filtrate chamber. The drive shaft 10 is rotated by means of a suitable drive motor 11. The whole pressure filter is disposed on an appropriate stand 4.

As FIGS. 1 and 2 further show, each backwashing head is provided with a plurality of spring struts 6 extending from the center of the backwashing head to the radial end portion thereof. The spring struts 6 extend between brackets 37 which are fastened at the edge of each carrier plate 5 and a support block 38 centrally located at the respective carrier plate, wherein the spring struts are clamped between the central support block 38 and the corresponding brackets 37. The spring struts 6 are biased and apply a corresponding force to the bracket 37 so that a momentum is applied to the radially outer edge portion of the corresponding carrier plate 5 which pushes this edge portion of the carrier plate towards the corresponding filter surface.

FIG. 2 shows that each arm of the carrier plate 5 is associated with two spring struts which extend over the corresponding hollow slats. The spring struts provide that the curved hollow slats with the corresponding curved slot-like aperture are pressed uniformly against the filter surface everywhere so that the pressure difference necessary for the backwashing is maintained.

Figure 3:
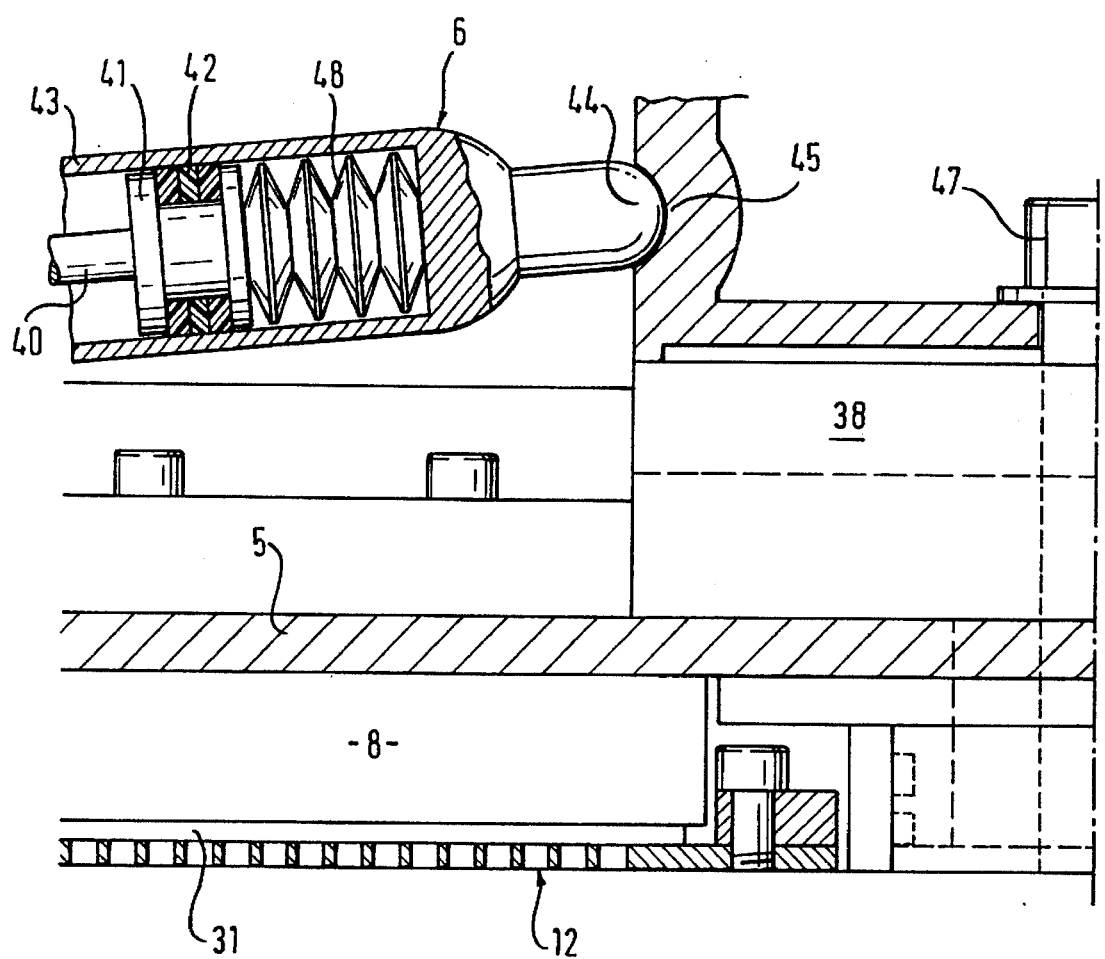
FIG. 3 is a schematic section through the central bearing of the backwashing head with presentation of the support of a spring strut.

FIG. 3 shows the exact design of the spring struts 6. One recognizes that the spring struts have a rod 40 which is provided at one end with a piston-like enlargement 41 sealingly (seal 42) guided in a cylinder 43. A number of cup springs 48 is located within the cylinder. These cup springs act on the piston-like enlargement 41 and thus on the rod 40 with a pressure directed to the left in the figure so that the rod acts with a corresponding pressure on the associated bracket 37 (not shown in FIG. 3). At its end away from the rod 40 the cylinder has a stud 44 with a semispherical end surface which engages into a correspondingly formed semispherical bearing socket 45. This bearing socket is formed at the central support block 38 which is mounted to the carrier plate by means of a central screw 47. Of course, a plurality of semispherical depressions 45 is located at the central support block 38. These depressions receive the corresponding spring strut cylinders. The spring struts can freely rotate relative to the backwashing head by means of the ball joint formed in this manner.

The spring struts 6 cooperate with a resilient support for the respective contact members of the backwashing head with the filter surface. According to the shown embodiment the contact members are formed as hollow slats carried by the carrier plate 5 and having at the lower side thereof a slot-like aperture for carrying out the backwashing process. The hollow slats with the corresponding slot-like aperture are curved.

Figure 4:
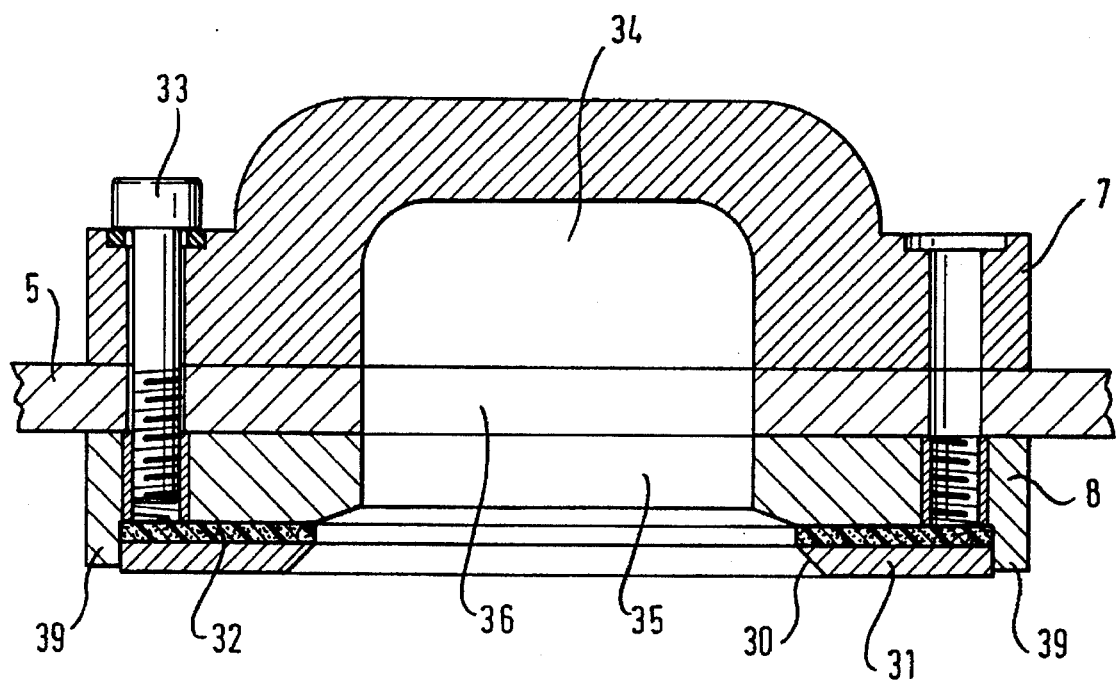
FIG. 4 is a section through a part of the carrier plate of the backwashing head provided with a hollow slat, the part showing an embodiment of the resilient support of the contact plate.

FIG. 4 shows a cross-section through such a hollow slat. One recognizes the carrier plate 5 over which the drain portion 7 and under which the suction portion 8 of the backwashing slat (hollow slat) are disposed. The slot-like aperture 30 located at the lower side of the suction portion 8 narrows into a suction chamber 35 towards the carrier plate, the suction chamber merging into a drain channel 34 extending to the hollow shaft by means of an aperture 36 within the carrier plate.

A resiliently supported contact plate or oscillation plate 31 ist disposed at the side of the slat adjacent to the filter surface. The plate 31 is resiliently supported at 32. The resilient support is formed by a silicone cushion. One recognizes that the oscillation plate is guided by means of two lateral guide members 39 such that it can only move upwardly and downwardly in the figure. Moreover, the oscillation plate 31 is not mounted to the hollow slat but is held through the contact with the filter surface.

The radial outer regions of the backwashing slats are pressed against the filter surface through the spring struts 6.

The silicone bearing 32 provides for a uniform pressing since corresponding unevennesses on the filter surface can be compensated by the resiliency of the oscillation plate 31.

Figure 5:
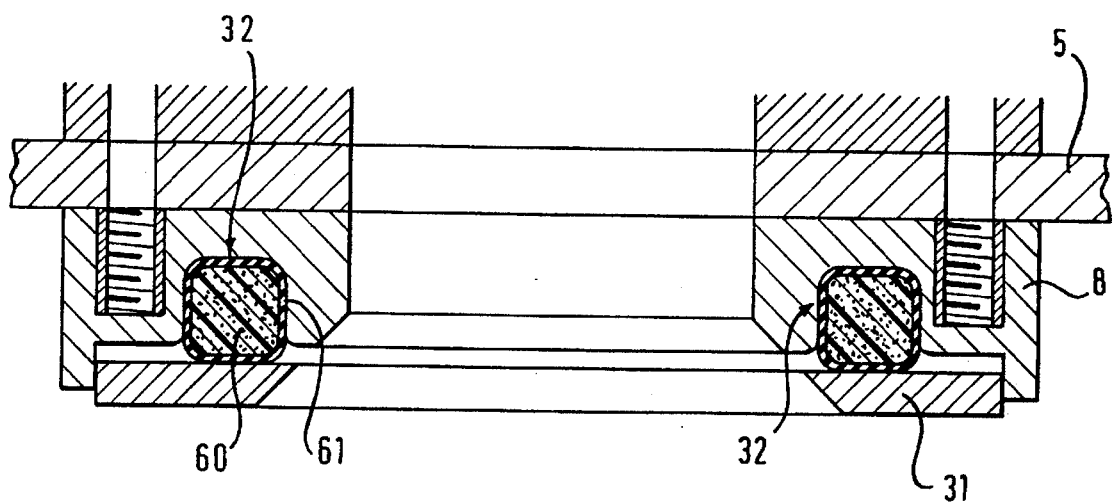
FIG. 5 is a section through a part of a carrier plate with hollow slat which shows a further embodiment of the resilient support of a contact plate.

FIG. 5 shows a corresponding section through a hollow slat as FIG. 4, wherein here the upper part of the slat is not shown. This embodiment has a slightly different design of a resilient support 32 for the carrier plate or oscillation plate 31. In this case, the resilient support consists of two elongated silicone cushions consisting each of a sheath 51 in which a silicone gel 50 is disposed. The corresponding support cushions are disposed in a recess of the lower part 8 of the backwashing slat. Also in this case the support causes a certain up and down movability of the oscillation plate 31 for the compensation of unevennesses on the filter surface.

Figure 6:
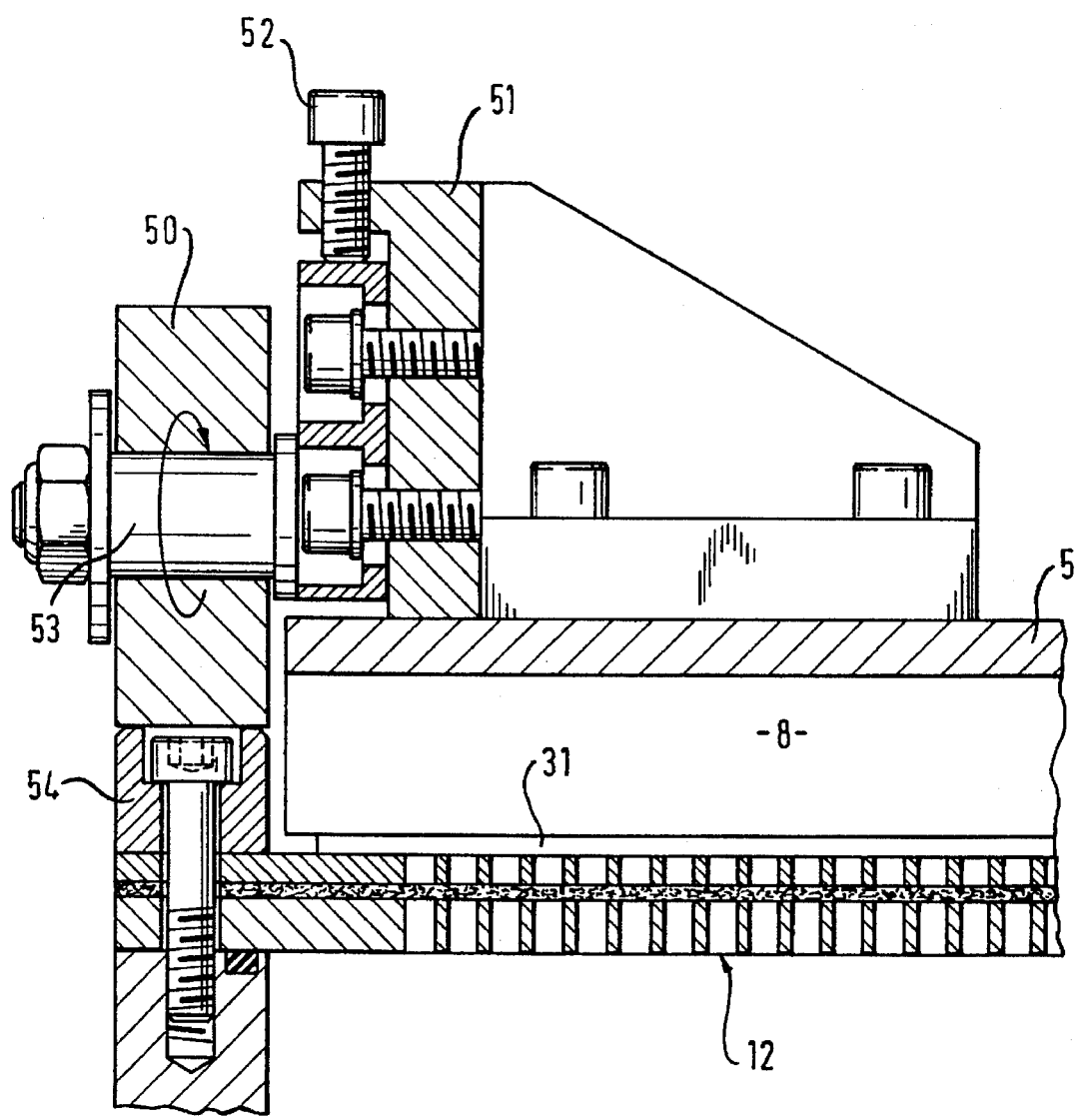
FIG. 6 is a part-longitudinal section of the end portion of a carrier plate which is provided with a roller bearing.

FIG. 6 shows a radial section through the edge portion of a carrier plate. According to this embodiment the carrier plate is not cantilevered but has a support roller 50 at its radial end which is rotatably mounted at a fastening element 51 by means of a stud 53. The fastening element 51 is mounted to the carrier plate 5. The height of the support roller 50 can be regulated by means of a screw 52. Upon rotation of the carrier plate the support roller 50 rolls on a raised ring 54 which is disposed at the edge of the perforated plates 12 of the associated filter element. Also in this embodiment the corresponding backwashing slat, the lower part of which is shown at 8, is provided with a resiliently supported oscillation plate 31 contacting the perforated plate 12. The corresponding spring struts (not shown in FIG. 6) cooperate with the resiliently supported oscillation plate 31 and the roller 50 in order to guarantee a uniform pressure of the backwashing slats against the filter surface. Accordingly, in this case three possibilities of adjustment are present (spring struts, resilient support of the oscillation plate and support roller) so that a very exact adjustment of the contact pressure of the backwashing head results.

I claim:

1. A pressure filter comprising:

a housing defining a fluid compartment, said housing having a fluid inlet communicating with said fluid compartment;

means forming at least one filter surface in the fluid compartment, said filter surface having a plurality of apertures, one side of the filter surface being restricted by the fluid compartment and another side of said filter surface being restricted by a filtrate compartment formed in said housing and having a filtrate outlet;

a backwashing unit comprising a radially extending backwash head extending from a central support to a radially outer portion of said filter surface, said backwash unit further including means for rotating the backwashing head to sweep over the filter surface and sealing a part of the filter surface with respect to the fluid compartment, the backwashing head defining a backwashing compartment having at least one suction chamber having a slot-like aperture opened to the filter surface and having connected thereto a reject drain; and a resiliently acting pressure means associated with the backwashing head for pressing a radial outer portion of the backwashing head axially towards the filter surface, the pressure means being formed by at least one biased radial spring strut supported centrally at the central support and at a radial end portion of the backwashing head.

2. The pressure filter according to claim 1, further comprising means for adjusting the pressure applied by the pressure means.

3. The pressure filter according to claim 1, wherein a part of the backwashing head contacts the filter surface and is resiliently supported.

4. The pressure filter according to claim 1, wherein the spring strut is supported radially outside the plane of the backwashing head.

5. The pressure filter according to claim 1, wherein the spring strut is supported radially inside in a part-spherical bearing socket by means of a part-spherical stud.

6. The pressure filter according to claim 1, wherein the spring strut includes a rod engaging into a cylinder containing at least one spring and on which a pressure is applied by the spring.

7. The pressure filter according to claim 1, wherein the backwashing head includes a carrier plate at which at least one hollow slat sweeping over the filter surface is disposed, the hollow slat having the slot-like aperture, and that the resiliently acting pressure means resiliently presses the radial outer edge of the carrier plate towards the filter surface.

8. The pressure filter according to claim 7, wherein at least one bracket is disposed at the radial outer edge of the carrier plate, the pressure means being tensioned against the bracket.

9. The pressure filter according to claim 1, wherein the backwashing head has a bearing at its radial end portion which slides or rolls on the filter surface.

10. The pressure filter according to claim 9, wherein the bearing includes at least one roller rolling on a raised ring of the filter element.

11. The pressure filter according to claim 10, further comprising means for adjusting a pressure of said at least one roller against the filter element.

12. The pressure filter according to claim 3 wherein the resilient support of a part of the backwashing head contacting the filter surface is formed by a resiliently supported plate at a lower side of the backwashing head.

13. The pressure according to claim 12 wherein the plate is supported by a silicone bearing.

14. The pressure filter according to claim 13 wherein the silicone bearing is formed by sheathed silicone gel cushions.

15. The pressure filter according to claim 12 wherein the plate is guided on both sides.

* * * * *